C. E. HENRIOD.
TRANSMISSION GEARING.
APPLICATION FILED AUG. 28, 1908.

917,729.

Patented Apr. 6, 1909.
2 SHEETS—SHEET 2.

WITNESSES
Joseph C. Cavanaugh
Josephine Weyl

INVENTOR
Charles Edouard Henriod
BY
Max W. Ordmann
ATTORNEY

UNITED STATES PATENT OFFICE.

CHARLES EDOUARD HENRIOD, OF NEUILLY, FRANCE.

TRANSMISSION-GEARING.

No. 917,729.  Specification of Letters Patent.  Patented April 6, 1909.

Original application filed January 16, 1908, Serial No. 411,124. Divided and this application filed August 28, 1908.
Serial No. 450,718.

*To all whom it may concern:*

Be it known that I, CHARLES EDOUARD HENRIOD, a citizen of the Republic of France, residing at Neuilly, Seine, France, have invented certain new and useful Improvements in Transmission-Gearing, of which the following is a specification.

The present invention relates to improvements in connection with transmission gearings described in my prior application, Serial No. 411,124, filed January 16th, 1908, and in my application Serial No. 450,717 filed simultaneously with the present one. In the construction shown in the mentioned two applications the different speeds forward and backward are obtained with as many pairs of gears as there are speeds desired.

In the construction which is the subject of the present invention all speeds from zero on and a reverse movement are obtained by the same gears, the gear on the shaft to be driven being more or less retarded by means of a progressively acting mechanical brake.

To make my invention more clear the same is illustrated in the accompanying drawing in which similar reference letters denote corresponding parts and in which—

Figure 1:
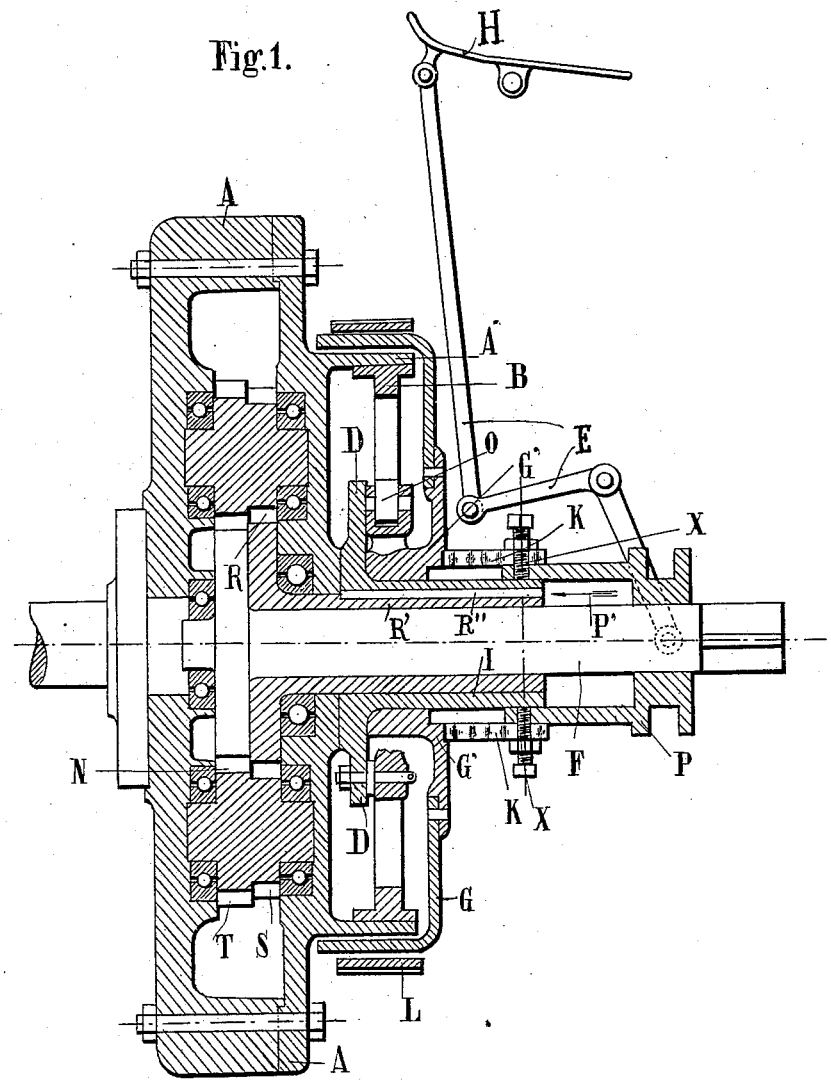
Figure 2:
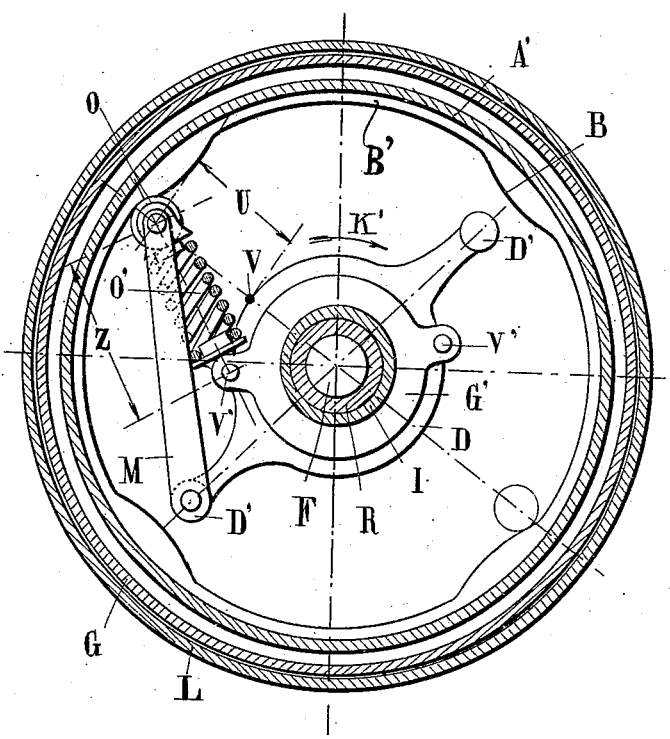

Figure 1 is a central section through the fly wheel and Fig. 2 a cross section through one end of the fly wheel showing the operation of the brake mechanism.

With reference to the drawing, A denotes the sectional fly wheel, the sections of which are permanently secured to one another.

T and S are gears journaled in the fly wheel.

N is a gear keyed to the shaft F to be driven which is to revolve with variable speeds forward and with one speed backward, and R is a gear loose upon the shaft to be driven and integral with a sleeve R'.

A' is a flange integral with one of the sections of the fly wheel and provided on its inner circumference with a circular rail B' having a series of cam projections B.

D is a disk keyed at R'' on the sleeve R' of the gear R and provided with an ear D' in which a rod or arm M is fulcrumed. This rod or arm carries at one end a roller O, and by means of a spring O', one end of which is attached to the nave G' of a drum G and the other to the rod M, is held in contact with the rail B'. The drum G is mounted on the nave I of the disk D, so as to be capable of oscillating thereon.

P is a sleeve provided with a circular groove for the engagement with a system of levers E to be operated by means of a pedal H. This sleeve carries at its inner end two projections or fingers X which slidably engage in helical projections extending from the nave G' of the drum G.

L is a brake of any suitable construction arranged to act against the outer surface of the pulley or drum G.

The mode of operation of this apparatus is as follows:—Supposing the fly wheel A revolves with constant speed and the shaft F to be driven is at rest, then the roller or rollers O will at this moment not be in contact with the projections or teeth B and the wheel R will be driven by the satellite wheel S in the same direction. In order to increase the speed of the gear R the sleeve P is shifted in the direction of the arrow P', whereby the nave G', by virtue of the fingers X sliding in the helical projections K thereof, will be caused to swing in the direction of the arrow K'. This will bring the point V' nearer to the point V gradually shortening the lever arm Z. It will be easily understood that the spring O' will thereby be compressed, causing the roller O to press against the projections or teeth B with a force corresponding to the length of the lever arm. The different speeds thus obtained will be the resultant from the lever arm Z to the lever arm U. If the pressure is such that the roller O is completely arrested upon one of the teeth B, then the gear R will revolve with the speed of the motor and will consequently drive the shaft F with the same speed, although the latter is connected with the satellite wheel T by wheels R and S of a different ratio. If, on the contrary, the gear R is rendered immovable by the drum G through the brake L, then the satellite wheel S will receive a reverse movement that will be transmitted to the gear N, driving the shaft F in reverse direction.

What I claim and desire to secure by Letters Patent is:—

1. In a transmission gearing, the combination with the motor shaft and the shaft to be driven, of a fly wheel having a flange provided on its inner surface with cam projections, two satellite wheels journaled in said fly wheel, a wheel keyed on the shaft to be driven and with which constantly meshes one of the satellite wheels, a loose wheel on the shaft to be driven meshing with the second satellite wheel, and a clutch mechanism connected with said loose wheel and acting against said inner cam surface of the flange so as to progressively connect the loose wheel with the fly wheel.

2. In a transmission gearing, the combination with the motor shaft and the shaft to be driven, of a sectional fly wheel, the sections of which are permanently secured to one another, one of the sections of the fly wheel having a flange provided on its inner surface with cam projections, two satellite wheels journaled in said fly wheel, a wheel keyed on the shaft to be driven and with which constantly meshes one of the satellite wheels, a loose wheel on the shaft to be driven meshing with the second satellite wheel, and a clutch mechanism connected with said loose wheel and acting against said inner cam surface of the flange so as to progressively connect the loose wheel with the fly wheel.

3. In a transmission gearing, the combination with the motor shaft and the shaft to be driven, of a sectional fly wheel, the sections of which are permanently secured to one another, one of the sections of the fly wheel having a flange provided on its inner surface with cam projections, two satellite wheels journaled in said fly wheel, a wheel keyed on the shaft to be driven and with which constantly meshes one of the satellite wheels, a loose wheel on the shaft to be driven meshing with the second satellite wheel, a disk keyed to the said loose wheel, a spring actuated arm pivoted to said disk a roller carried by said arm, said arm being adapted with its roller to constantly bear on the cam surface of the said flange, and means for causing the arm to be gradually shortened to vary the degree of pressure against said cam surface, so as to permit progressive braking of the said loose wheel.

4. In a transmission gearing, the combination with the motor shaft and the shaft to be driven, of a sectional fly wheel, the sections of which are permanently secured to one another, one of the sections of the fly wheel having a flange provided on its inner surface with cam projections, two satellite wheels journaled in said fly wheel, a wheel keyed on the shaft to be driven and with which constantly meshes one of the satellite wheels, a loose wheel on the shaft to be driven meshing with the second satellite wheel, a disk keyed to the said loose wheel, an arm pivoted to the said disk a roller carried by said arm, a swinging drum upon the nave of the said disk, a spring attached at one end to the said drum and on its other end to the arm and adapted to constantly hold the lever in contact with the cam surface of the flange, and by the oscillation of the said swinging drum to exert a progressive pressure against the said cam surface, and means for imparting swinging movement to said disk.

5. In a transmission gearing, the combination with the motor shaft and the shaft to be driven, of a sectional fly wheel, the sections of which are permanently secured to one another, one of the sections of the fly wheel having a flange provided on its inner surface with cam projections, two satellite wheels journaled in said fly wheel, a wheel keyed to the shaft to be driven and with which constantly meshes one of the satellite wheels, a loose wheel on the shaft to be driven meshing with the second satellite wheel, a disk keyed to the said loose wheel, an arm pivoted to the said disk a roller carried by said arm, a swinging drum upon the nave of the said disk, a spring attached with one end to said drum and with its other end to the arm and adapted to constantly hold the roller in contact with the cam surface of the flange and by the oscillation of the said swinging drum to exert a progressive pressure against the said cam surface, a slidable sleeve on the shaft to be driven, having fingers and helical projections on the swinging drum to engage with said fingers and by the displacement of said sleeve to impart a swinging movement to the said swinging drum and means for displacing the said sleeve.

6. In a transmission gearing, the combination with the motor shaft and the shaft to be driven, of a sectional fly wheel, the sections of which are permanently secured to one another, two satellite wheels journaled in said fly wheel, a wheel keyed to the shaft to be driven and with which meshes one of the satellite wheels, a loose wheel on the shaft to be driven meshing with the second satellite wheel, an oscillating drum on the nave of the loose wheel, and a brake to act against said oscillating drum and to render the said loose wheel immovable for the transmission of reverse movement to the shaft to be driven.

7. In a transmission gearing, the combination with the motor shaft and the shaft to be driven, of a sectional fly wheel, the sections of which are permanently secured to one another, one of the sections of the fly wheel having a flange provided on its inner surface with cam projections, satellite wheels journaled in said fly wheel, a wheel keyed on the shaft to be driven and with which constantly meshes one of the satellite wheels, a loose wheel on the shaft to be driven meshing with the second satellite wheel, a disk keyed to the said loose wheel, an arm pivoted to the said disk, a roller carried by said arm, a swinging drum upon the nave of the said disk, a spring attached at one end to the said drum and at its other end to the arm and adapted to constantly hold the lever in contact with the cam surface of the flange and by the oscillation of the said swinging drum to exert a progressive pressure against the said cam surface, means for imparting swinging movement to said disk, and a brake to act against said oscillating drum to render the said loose wheel immovable for the transmission of reverse movement to the shaft to be driven.

In testimony whereof I affix my signature in presence of two witnesses.

CHARLES EDOUARD HENRIOD.

Witnesses:
    GASTON DEMOGET,
    HANSON C. COXE.